United States Patent [19]

Oishi et al.

[11] Patent Number: 4,700,254
[45] Date of Patent: Oct. 13, 1987

[54] MAGNETIC TAPE CASSETTE

[75] Inventors: Kengo Oishi; Masayoshi Moriwaki, both of Kanagawa, Japan

[73] Assignee: Fuji Photo Film Co., Ltd., Kanagawa, Japan

[21] Appl. No.: 758,005

[22] Filed: Jul. 23, 1985

[30] Foreign Application Priority Data

Jul. 23, 1984 [JP] Japan .......................... 59-110216[U]

[51] Int. Cl.⁴ ....................... G11B 23/04; G11B 15/60
[52] U.S. Cl. ................................ 360/132; 360/130.21
[58] Field of Search ................ 360/132, 130.21, 130.2; 242/197-200

[56] References Cited

U.S. PATENT DOCUMENTS 3,648,941 3/1972 Merry .................................. 360/132
3,751,043 8/1973 Bracci .................................. 360/132

FOREIGN PATENT DOCUMENTS 3218097 12/1982 Fed. Rep. of Germany ...... 360/132
59-124072 7/1984 Japan .................................. 360/132

Primary Examiner—John H. Wolff
Assistant Examiner—Matthew J. Bussan
Attorney, Agent, or Firm—Sughrue, Mion, Zinn, Macpeak and Seas

[57] ABSTRACT

A magnetic tape cassette having an improved tape guide structure and ease of assembly. Tape guides are arranged on both sides of the front opening of the magnetic cassette, the guides being adapted to be brought into sliding contact with the magnetic tape to guide the latter. Each tape guide is in the form of a solid post. Holding members adapted to hold these tape guides are formed on one of upper and lower half cases of the cassette, and tape guides are fixedly inserted into grooves formed in the holding members, with each groove having a portion which is broader than its opening.

3 Claims, 4 Drawing Figures

MAGNETIC TAPE CASSETTE

BACKGROUND OF THE INVENTION

The present invention relates to magnetic tape cassettes, and more particularly to a magnetic tape cassette having improved tape guides which are brought into sliding contact with a magnetic tape to guide the latter.

In an audio or video magnetic tape cassette, tape guides are provided on both (right and left) sides of the front opening of the cassette, and the guides are brought into sliding contact with the rear surface (base) of the magnetic tape to guide the latter. In an audio magnetic tape cassette, the tape guides are usually made of plastic resin and are integral with one of the cassette halves. However, recently, cylindrical metal tape guides have been extensively employed, which guides are fitted in the cassettes. The metal tape guides can maintain the initial characteristics of the tape, for instance, the tape sliding characteristic, satisfactory for a long period. Video magnetic tape cassettes generally use such cylindrical metal tape guides.

Difficulties accompanying a conventional magnetic tape cassette will be described with reference to FIG. 1 which shows the fundamental structure and the arrangement of metal tape guides of a type extensively employed in video tape cassettes or the like.

The tape guide 11 shown in FIG. 1 is in the form of a cylinder, the outer wall 2 of which is brought into sliding contact with the base surface of a magnetic tape to guide the latter. During the assembling of the magnetic tape-cassette, the tape guide 11 is fitted on a lower guide post 8 which is integrally formed on the lower half case 6. If the tape guide 11 is excessively tightly fitted on the lower guide post 8, the outer wall of the lower guide post 8 may be scraped away, or the tape guide 11 may be deformed, or at worst broken, depending on the material. Especially in the case where the tape guide 11 is formed by curving a plate-shaped material, the joint may be opened, thus deforming the tape guide.

After the tape guide 11 is engaged with the lower guide post 8 on the lower half case 6, the upper half case 7, carrying an upper guide post 9 to be inserted into the tape guide 11, is placed on the lower half case 5. The tape guide 11 is fixedly secured in the cassette, for instance, with a screw 10 which is screwed into the upper guide post 9 through a through-hole 8a in the lower guide post 8.

When the upper and lower half cases 6 and 7 are combined together, sometimes the tape guide 11 is tilted. In other words, due to the molding process, the upper and lower half cases 6 and 7 may have dimensions which vary, and therefore the two guide posts 8 and 9 are liable to be displaced, which may tilt the tape guide 11. In addition, the molded upper and lower half cases are liable to be nonuniform in thickness, that is, the inner walls of the cassette, which are in contact with the tape guide, are liable not to be completely flat. Therefore, sometimes the tape guide may come into a sloping position during assembly. If the tape guide 11 is inclined with respect to the cassette, the tape running path is unstable and the tape running characteristic is lowered.

For a cassette incorporating a metal tape or vacuum-deposited tape suitable for high density recording and reproducing, it is preferable to use ceramic tape-guides having an excellent physical strength (wear resistance) instead of the above-described conventional tape guides made of metal because, where the former tape guides are employed, the magnetic tape is less deteriorated in certain characteristics and attains an excellent running performance. However, the ceramic tape guide is still disadvantageous in that it is difficult to form a cylindrical ceramic tape guide, the wall is liable to be broken, and it is considerably difficult to set the ceramic tape guides in the cassette.

SUMMARY OF THE INVENTION

In view of the foregoing, an object of the invention is to provide a magnetic tape cassette having tape guides which remarkably improve the tape running characteristic and which are maintained perpendicular to the cassette.

The foregoing object of the invention has been achieved by the provision of a magnetic tape cassette comprising: tape guides arranged on both sides of the front opening of the magnetic tape cassette and which are brought into sliding contact with the magnetic tape to guide the latter, and upper and lower half cases, in which, according to the invention, each tape guide is in the form of a solid post, and holding members adapted to hold the tape guides are formed on one of the upper and lower half cases, the tape guides being fixedly inserted into grooves which are formed in the holding members in such a manner that each groove is broader towards its bottom in section.

DESCRIPTION OF THE PREFERRED EMBODIMENTS

Figure 1:
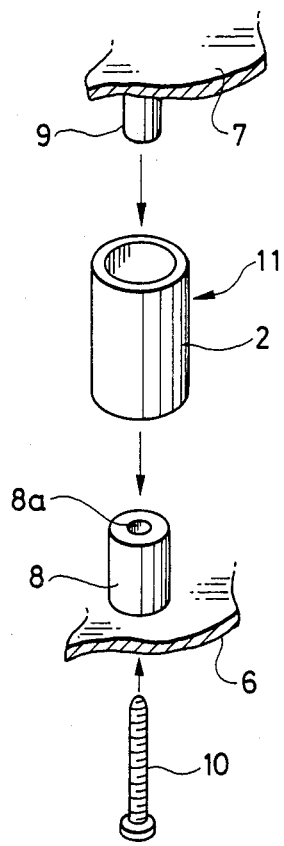
FIG. 1 is an exploded perspective view showing the structure and arrangement of a conventional tape guide.

The invention will be described in detail with reference to preferred embodiments shown in the drawings.

Figure 2:
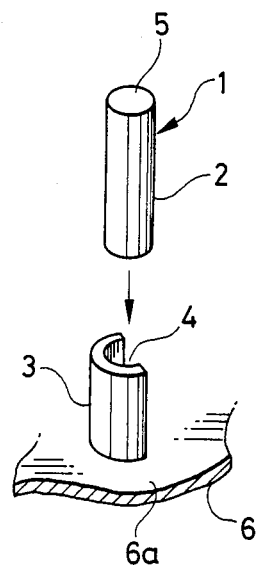
FIG. 2 is an exploded perspective view showing essential parts of a preferred embodiment of a magnetic tape cassette of the invention.

FIG. 2 is an exploded perspective view showing essential parts of a video tape cassette of the invention.

A tape guide 1 as shown in FIG. 2 is in the form of a solid cylinder or post, the outer wall 2 of which is brought into sliding contact with the rear surface of a magnetic tape to guide the latter. The lower half case 6 of the cassette has holding members 3 on both (right and left) sides of the front opening of the cassette. The holding members 3 are adapted to hold a pair of tape guides 1.

Each of the holding members 3 has a groove 4 extending perpendicular to the inner wall 6a of the lower half case 6. The groove 4 is formed so that it extends around the outer wall 2 of the tape guide 1 over more than an angle of 180°. In other words, the groove 4 is substantially C shaped in horizontal section, as shown in FIG. 3, so that the tape guide 1 is secured to the lower half case 6.

During the assembly of the cassette, the tape guide 1 is inserted into the groove 4 of the holding member 3 from above so that the tape guide 1 is secured to the lower half case 6, as described above. After the two tape guides have been secured, the upper half case (not shown) is placed on the lower half case 6 and is then fastened to the latter with screws or the like.

Once the cassette has been assembled, the upper end 5 of the tape guide 1 is not in contact with the inner surface of the half case, or it only softly contacts the inner surface.

Figure 3:
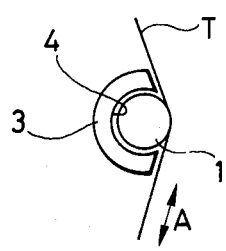
FIG. 3 is a plan view showing the arrangement of a tape guide illustrated in FIG. 2.

The exposed part of the outer wall 2 (that part not embraced by the groove 4) of each tape guide 1 is in sliding contact with the magnetic tape T, as shown in FIG. 3, to guide the latter in the directions of the arrow A.

The tape guide 1 may be formed with a material such as zirconia ceramics having a considerably excellent tape sliding characteristic and wear resistance. The holding members 3, integral with the lower half case 6, may be formed of ABS resin or PS resin, the same as the lower half case 6.

In the above-described embodiment, the holding members 3 are formed on the lower half case 6. However, they may be formed on the upper half case.

In the above-described embodiment, the tape guide 1 is in the form of a circular cylinder. However, the invention is not limited thereto or thereby. For instance, it may be a prism substantially trapezoidal in section as shown in FIG. 4.

Figure 4:
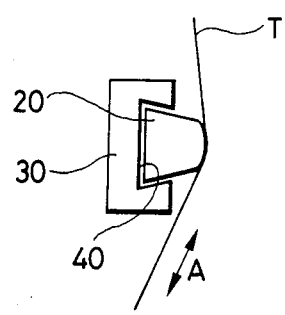
FIG. 4 is a plan view showing essential parts of another embodiment of the invention.

The ceramic tape guides 20, substantially trapezoidal in section as shown in FIG. 4, are held by holding members 30 formed on one of the lower and upper half case, similar to the above-described embodiment. Each holding member 30 has a groove 40 trapezoidal in section which is broader towards the bottom so that it can positively hold the tape guide 20. The tape guide 20 has a part which is brought into sliding contact with the magnetic tape T. This part has a curved surface with a suitable curvature so as to not scrape the magnetic tape.

Preferred embodiments of the invention have been described with reference to a video tape cassette. However, the technical concept of the invention can be equally applied to tape guides of other tape cassettes such as audio tape cassettes.

As is apparent from the above description, in the magnetic tape cassette according to the invention, the tape guides 1 (or 20) are positively secured to the upper or lower half case by means of the holding members 3 (or 30). Therefore, the difficulty of the upper and lower half cases shifting when combined together is eliminated. Thus, the tape guides 1 (or 20) can be correctly set in the cassette while maintaining their strict perpendicularity.

According to the invention, the holding members 3 (or 30) positively hold the tape guides 1 (or 20) in such a manner that the former embrace the latter. Therefore, although heretofore it was not preferable to use ceramic tape guides because doing so lowered the cassette assembling efficiency, in accordance with the invention, the ceramic tape guide 1 (or 20) can be readily set in the cassette with their perpendicularity maintained. Furthermore, because the tape guide can be provided in the form of a solid cylinder or prism, the cassette assembling efficiency is improved, and the characteristics such as tape slidability can be maintained satisfactorily for a long period of time.

What is claimed is:

1. A magnetic tape cassette including upper and lower half cases assembled together to define a cassette, comprising:
   a. at least one tape guide mounted within the cassette and disposed transversely between the upper and lower case halves for sliding contact with a magnetic tape to guide said tape, said tape guide being in the form of a solid and rigid elongate ceramic post (1; 20) having an increasing width in a direction away from said tape, and
   b. a holding member (3; 30) upstanding from just one of the case halves for retaining the tape guide, said holding member defining a groove (4; 40) for receiving the tape guide, said groove having an opening facing a path of tape movement, through which a narrower width portion of the tape guide extends exteriorly to engage the tape, a maximum interior width of said groove being greater than the width of said opening such that a wider width portion of the tape guide is retained within said groove and restrained from lateral movement in the direction of the opening, an upper end of the tape guide being unrestrained by any engagement with another one of the case halves.

2. The magnetic tape cassette as recited in claim 1, wherein said holding members are generally C-shaped in section to define grooves (4), and said tape guides are cylindrical tape guides for axial insertion into said grooves.

3. The magnetic tape cassette as recited in claim 1, wherein said holding members define a groove (40) having a generally trapezoidally shaped cross section, and said tape guides (20) are trapezoidal in shape to correspond to said groove, with one rounded side being in contact with the tape.

\* \* \* \* \*